United States Patent [19]

Uematsu

[11] Patent Number: 4,493,544
[45] Date of Patent: Jan. 15, 1985

[54] FOCAL-PLANE SHUTTER

[75] Inventor: Kimio Uematsu, Tokyo, Japan

[73] Assignee: Nippon Kogaku K.K., Tokyo, Japan

[21] Appl. No.: 492,719

[22] Filed: May 9, 1983

[30] Foreign Application Priority Data

May 20, 1982 [JP] Japan .................... 57-85454

[51] Int. Cl.³ .............................................. G03B 9/40
[52] U.S. Cl. ................................ 354/246; 354/250; 354/252
[58] Field of Search ............... 354/245, 246, 247, 248, 354/249, 250, 252

[56] References Cited

U.S. PATENT DOCUMENTS

| | | | |
|---|---|---|---|
| 3,847,476 | 11/1974 | Onda et al. | 354/252 |
| 3,903,539 | 9/1975 | Kitai et al. | 354/245 |
| 4,141,634 | 2/1979 | Inoue | 354/246 |
| 4,231,650 | 11/1980 | Saito et al. | 354/252 |
| 4,302,091 | 11/1981 | Harase et al. | 354/246 |

Primary Examiner—A. A. Mathews
Attorney, Agent, or Firm—Shapiro and Shapiro

[57] ABSTRACT

A focal-plane shutter for a camera comprises a pair of apertured base plates disposed parallel to each other with a predetermined spacing therebetween to form an aperture for exposure, and light-shielding blades mounted between the base plates at a normal position outwardly of one side of the aperture, the blades being adapted to move into the aperture to close the same while being guided by the surfaces of the base plates, the motion of the blades being terminated when part of the blades has moved past the opposite side of the aperture. The shutter further comprises a recess formed in the internal face of at least one of the base plates, the recess being of a dimension sufficient to receive part of a blade on the termination of motion and to provide larger spacing of the base plates at a position beyond the opposite side of the aperture.

8 Claims, 5 Drawing Figures

FOCAL-PLANE SHUTTER

BACKGROUND OF THE INVENTION

1. Field of the Invention

The present invention relates to a focal-plane shutter for use in photographic cameras and particularly to such a shutter including light-shielding blade means in the form of a flat plate which is adapted to move across an aperture for exposure such that the aperture will be closed by the surface of the blade means.

2. Description of the Prior Art

There is generally known a focal-plane shutter comprising a plurality of shutter blades which are driven by any suitable driving means to move within a space formed by two parallel base plates along the surfaces of these base plates with different movements of the blades so that an aperture will sequentially be closed by the shutter blades. Each of the base plates has an opening formed therein which is normally of a rectangular shape and defines the aperture for exposure. The shutter blades are normally retracted within the space outwardly of one side of the rectangular opening and then moved toward the opposite side of the opening to shield the light. One of the shutter blades which has the largest displacement is rapidly run across the rectangular opening into the portion of the space outside the opposite side of the aperture during the movement for exposure.

To assure the light-shielding property, it is desirable that the above space is limited to the minimum dimension necessary for the shutter blades to run across the aperture. It is therefore important that the shutter blades are maintained flat to assure that the shutter blade is smoothly moved into the portion of the space outwardly of the opposite side of the rectangular opening thereacross immediately before the end of the movement. Recently, a new technique has been developed to decrease the mass of shutter blades themselves so that the shutter blades can more rapidly move to close the aperture throughout the entire area thereof substantially at the same time. Such a technique, however, tends to reduce rigidity of the shutter blades.

If a shutter blade of relatively low rigidity is moved at high speed and then abruptly stopped, part of the kinetic energy in the shutter blade acts thereon to deform the blade itself, resulting in a deflection in the crossing direction of the blade surface. The driving means is normally braked in the course of the movement of the shutter blade across the rectangular opening, that is, before the shutter blade begins to move into the space portion outside the opposite side of the opening. At this point of time, therefore, the shutter blade is deformed in the crossing direction of the blade surface and loses its flatness. Thus the shutter blade fails to move smoothly into the space portion outside the opposite side of the opening. In the worst case, the shutter blade impacts the opposite edge of the base plate, causing damage to the shutter blade.

SUMMARY OF THE INVENTION

It is an object of the present invention to provide a focal-plane shutter comprising shutter blade means which has an increased durability at higher speed.

Another object of the present invention is to provide a focal-plane shutter which avoids any contact or impact between its shutter blades and the peripheral edges of an aperture, and thus avoids damage to the shutter.

The present invention provides a focal-plane shutter comprising a pair of apertured base plates disposed parallel to each other with a predetermined spacing therebetween to form an aperture for exposure, and light-shielding blade means mounted between said base plates at a normal position outwardly of one side of said aperture, said blade means being adapted to move into said aperture to close the same while being guided by the surfaces of said base plates, the motion of said blade means being terminated when part of said blade means has moved past the opposite side of said aperture, said shutter further comprising a recess formed in an internal face of at least one of said base plates, said recess being of a dimension sufficient to receive said part of said blade means on the termination of motion and to provide a larger spacing of said base plates at a position beyond to the opposite side of said aperture.

DESCRIPTION OF THE PREFERRED EMBODIMENTS

Figure 1:
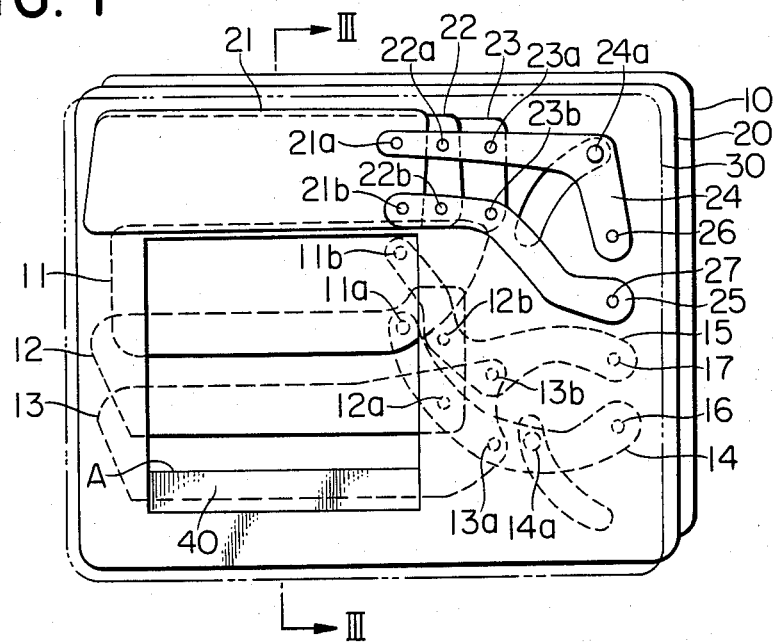
FIG. 1 is a plan view showing a focal-plane shutter in accordance with an embodiment of the present invention under its shutter-charge condition.

Referring to FIG. 1, there is herein shown a focal-plane shutter having two sets of quadric linkage structures each of which consists of two arms and three shutter blades, two sets of shutter blades being adapted to move in parallel motion with a predetermined sequence to form a desired slit.

Three base plates 10, 20 and 30 are located parallel to one another with a predetermined spacing being formed between each pair of adjacent base plates. Each of these base plates has an exposure aperture A formed therein which is of a rectangular shape having dimensions 24 mm×36 mm. The shutter blades 11, 12, 13 are made of any suitable metal or plastic material and disposed one after another to provide aperture opening blades. The first actuating arms 14 and 15 are rotatably supported by shafts 16 and 17, respectively. The blade 11 is pivotably mounted on the arms 14 and 15 by means of pins 11a and 11b; the blade 12 is pivotably mounted on the arms 14, 15 by means of pins 12a, 12b; and the blade 13 is pivotably mounted on the arms 14, 15 by pins 13a, 13b. The blades 11, 12, 13 and arms 14, 15 are all disposed between the base plates 10 and 20. The shafts 16, 17 are pivoted to the base plate 10. Thus, the aperture opening blades 11, 12 and 13 are moved across the shorter sides of the aperture A in parallel motion when the arms 14 and 15 are rotated.

Aperture closing blades are provided by shutter blades 21, 22 and 23 which are pivotably mounted on the second actuating arms 24 and 25 by means of pins 21a, 21b; 22a, 22b; and 23a, 23b, respectively. The blade 21 cooperates with the aperture opening blade 11 to form an exposure slit. The blades 21, 22, 23 and arms 24, 25 are disposed between the base plates 20 and 30. The arms 24 and 25 are rotatably supported by shafts 26 and 27 which are pivotably attached to the base plate 30. Thus, the aperture closing blades 21, 22 and 23 are moved across the shorter sides of the aperture A in parallel motion when the arms 24 and 25 are rotated.

Each of the arms 14 and 24 includes a drive pin 14a or 24a firmly attached thereto which is adapted to be driven by a drive in a shutter driving mechanism (not shown) to swing the respective arm 14 or 24.

Figure 3:
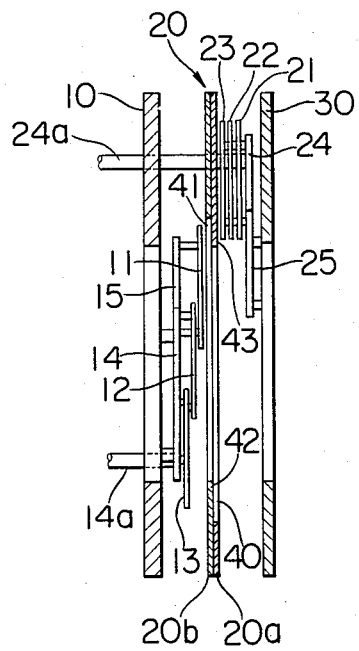
FIG. 3 is a cross-sectional view taken along a line III—III in FIG. 1.
Figure 4:
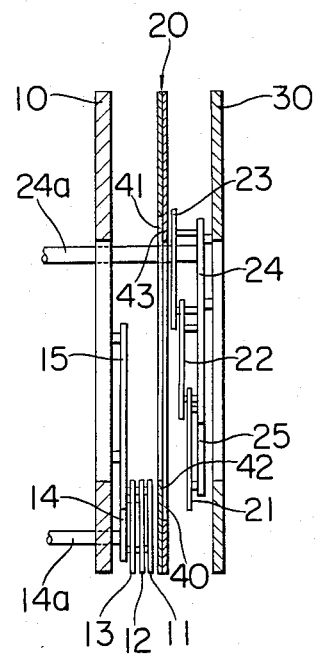
FIG. 4 is a cross-sectional view showing the embodiment of the present invention on the termination of exposure.

When the shutter is charged as shown in FIGS. 1 and 3, the aperture opening blades 11, 12 and 13 are spread out under the action of the arm 14 to close the aperture A while the aperture closing blades 21, 22 and 23 are positioned outside the top edge of the aperture A one after another by means of the arm 24. As the shutter is released, the arm 14 is rotated counter-clockwise to retract the aperture opening blades 11, 12 and 13 successively from the aperture A until they are located outside the bottom edge of the aperture one after another. After a predetermined period of time starting from the initiation of retraction in the aperture opening blades, the arm 24 is rotated counter-clockwise to spread out the aperture closing blades 21, 22 and 23 successively from the top edge to the bottom edge of the aperture A to close the same as shown in FIG. 4.

The aperture opening and closing blades are normally braked immediately before their movement is completed. In other words, the drive pin 14a and associated parts are braked immediately before the blade 11 is completely located outside the bottom edge of the aperture between the base plates 10 and 20 as the aperture opening blades 13, 12 and 11 are successively stored outside the bottom edge of the aperture A between the base plates 10 and 20. On the other hand, the drive pin 24a and associated parts are braked immediately before the bottom edge of the blade 21 moves past the aperture A as the aperture closing blades are successively spread out to close the aperture A. As a result, any reaction and associated sound and impact in the blades can be reduced.

Upon braking, however, the kinetic energy in the moving blade at high speed will act thereon to create a deflection in that blade in the crossing direction of the blade surface. Particularly, the blade 21 among the aperture closing blades is deflected before the bottom edge thereof reaches the bottom edge of the aperture A. Since the blade 21 contacts at one side with the arms 24 and 25, it is normally curved convexly toward the base plate 20. As a result, the central portion in the bottom edge of the blade 21 will impact the peripheral edge of the base plate 20.

Figure 2:
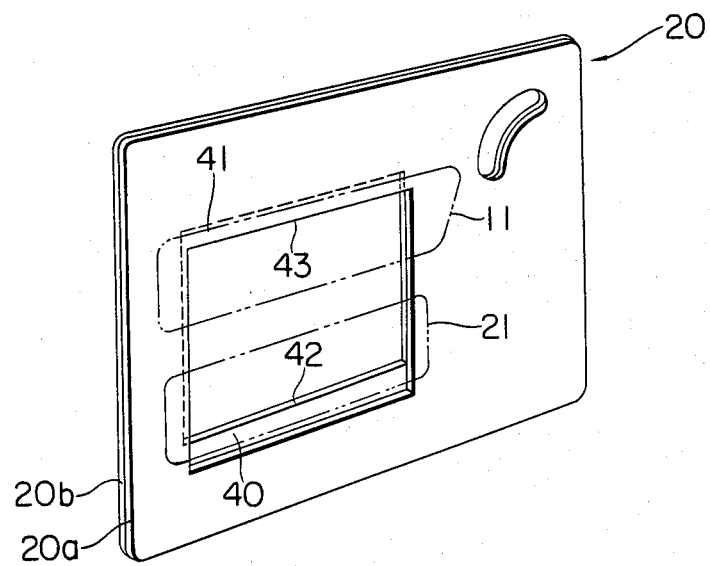
FIG. 2 is a perspective view of the central base plate shown in FIG. 1.

In the illustrated embodiment, the base plate 20 is constructed as shown in FIG. 2. The base plate 20 is of a laminated structure which consist of two flat plates 20a and 20b each having a rectangular opening formed therein. The openings in the respective flat plates 20a and 20b are adapted to offset from each other in the direction of blade movement upon being assembled. There is thus formed a recess 40 in a position facing the base plate 30 at the bottom edge of the aperture A. This recess 40 has a thickness corresponding to that of the flat plate 20a. Similarly, another recess 41 of a thickness corresponding to that of the flat plate 20b is formed in a position facing the base plate 10 at the top edge of the aperture. The recess 40 or 41 has a width in the direction of blade movement that exceeds the amount by which the blade 21 or 11 moves beyond the respective lower or upper edge of aperture A between the base plates 20, 30 or between the base plates 10, 20.

The recess 40 receives the bottom edge of the blade 21 which has curved convexly toward the base plate 20 immediately before the aperture closing blades completely close the aperture, that is, they reach such a position as shown in FIG. 4. This prevents any impact between the blade 21 and the edge of the aperture in the base plate 20. It is thus preferred that the depth of the recess 40 or the thickness of the flat plate 20a be determined by possible curvatures in the blade 21.

The recess 41 is effective in a shutter of a type in which the operation sequence started by the release of the shutter is terminated when the aperture opening blades 11, 12, 13 are further spread out upwardly at high speed from the position shown in FIG. 4 to close the aperture by both the aperture opening and closing blades. The recess 41 is formed to have a size sufficient to receive the top edge of the blade 11 which would curve convexly toward the base plate 20.

In the illustrated embodiment, the light-shielding property will not be lost since the wall 42 or 43 adjacent to the recess 40 or 41 is overlapped by the blade 21 or 11 in such a state that the aperture closing or opening blades close the aperture.

Figure 5:
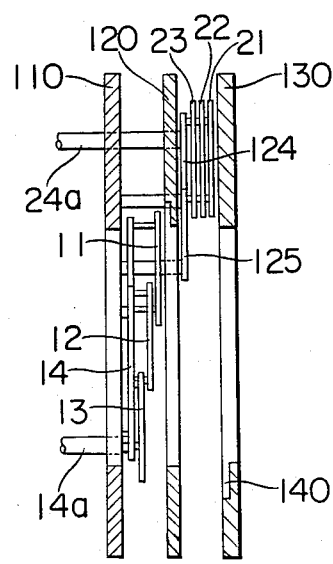
FIG. 5 is a cross-section of a focal-plane shutter in accordance with another embodiment of the present invention.

In a focal-plane shutter according to another embodiment shown in FIG. 5, the aperture closing blades 21, 22 and 23 are disposed between base plates 120 and 130. Second actuating arms 124 and 125 are located on the side of the aperture closing blades opposite to that shown in FIG. 3, that is, arms 124 and 125 are near the side of the central base plate. Upon release of the shutter, the aperture opening blades 11–13 which have closed the aperture are moved downwardly under the action of the drive pin 14a to initiate the exposure. Subsequently, the aperture closing blades 21–23 are downwardly spread out under the action of the drive pin 124a. After the bottom edge of the blade 21 has moved past the bottom edge of the aperture, the exposure is then terminated. Before the end of the exposure, the drive pin 124a is braked, resulting in a convex curvature of the blade 21 toward the base plate 130, i.e., in the direction away from the arms 124 and 125. In order to facilitate the downward movement of the curved blade 21, a recess 140 is formed in the base plate 130 at the bottom edge of the aperture.

In the just mentioned embodiment, the base plate 130 is a flat plate having a sufficient thickness. The recess 140 is formed in this flat plate by any suitable chemical treatment such as etching or the like.

I claim:
1. A focal-plane shutter comprising:
 (a) first and second base plates disposed parallel to each other with a predetermined space therebetween, each of said base plates being formed with an opening at a position opposed to that of the other base plate to define an exposure aperture having first and second edges, said first base plate having a recess facing said second base plate and located along said second edge of said aperture;
 (b) light-shielding means located within said space between said base plates, said light-shielding means including at least one substantially flat plate-shaped blade member for closing said aperture over at least part of the area thereof; and
 (c) drive means for moving said blade member along said base plates between an opening position in which the blade member is retracted outside said first edge of said aperture and a closing position in which said blade member is located across said aperture with part of said blade member juxtaposed with said recess.

2. A focal-plane shutter as defined in claim 1, wherein said drive means drives said blade member at one side thereof and is adapted to move said blade member by displacement along said space, and wherein said first base plate is disposed at the opposite side of said blade member.

3. A focal-plane shutter as defined in claim 1, wherein said first base plate includes two flat laminated plates each of which has an opening formed therein, with the opening in one of the laminated plates extending beyond the opening in the other of the laminated plates at said second edge of the aperture in order to constitute said recess.

4. A focal-plane shutter as defined in claim 1, wherein said light-shielding means includes a plurality of light-shielding blade members for closing said aperture at different areas thereof, and wherein said drive means is adapted to displace said blade members by different amounts for closing said aperture.

5. A focal-plane shutter as defined in claim 1, wherein said aperture is rectangular and said first and second edges are opposite edges of the rectangular aperture.

6. A focal-plane shutter comprising:
   (a) a first base plate having an opening formed therein;
   (b) second and third base plates disposed at opposite sides of the first base plate parallel to the latter and with predetermined spaces between each of the second and third base plates and the first base plate, each of said second and third base plates having an opening formed therein opposed with the opening of the first base plate to define an exposure aperture having first and second edges;
   (c) first light-shielding means disposed within the space between said first and second base plates and including a first blade member in the form of a substantially flat plate which is adapted to close said aperture over at least part of the area thereof;
   (d) second light-shielding means disposed within the space between the first and third base plates and including a second blade member in the form of a substantially flat plate which is adapted to close said aperture over at least part of the area thereof; and
   (e) drive means for moving said first and second blade members along the base plates between open and closed positions, the first blade member in its open position being retracted beyond said first edge of the aperture and in its closed position being located across said aperture adjacent to said second edge, and the second blade member in its open position being retracted beyond said second edge and in its closed position being located across said aperture adjacent to said first edge;
   (f) at least one of said base plates having a recess along one of said first and second edges of the aperture and positioned so as to be juxtaposed with part of one of said blade members in its closed position.

7. A focal-plane shutter as defined in claim 6, wherein said one of said base plates has a pair of said recesses at opposite sides thereof along said first and second edges of said aperture, respectively, and positioned so as to be juxtaposed with parts of said first and second blade members, respectively, at their closed positions.

8. A focal-plane shutter as defined in claim 6, wherein another of said base plates has a recess along the other of said first and second edges of the aperture and positioned so as to be juxtaposed with part of the other of said blade members in its closed position.

* * * * *